(12) United States Patent
Li et al.

(10) Patent No.: US 9,092,154 B2
(45) Date of Patent: Jul. 28, 2015

(54) DEVICE INFORMATION BACKUP METHOD, DEVICE, AND SYSTEM

(71) Applicant: Huawei Technologies Co., Ltd., Shenzhen, Guangdong (CN)

(72) Inventors: Jianzhao Li, Shenzhen (CN); Aijun Xiao, Shenzhen (CN); Guolan Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/275,561

(22) Filed: May 12, 2014

(65) Prior Publication Data

US 2014/0317368 A1  Oct. 23, 2014

Related U.S. Application Data

(63) Continuation of application No. PCT/CN2012/085029, filed on Nov. 22, 2012.

(51) Int. Cl.
*G06F 12/16* (2006.01)
*G06F 3/06* (2006.01)
*G06F 11/20* (2006.01)
(Continued)

(52) U.S. Cl.
CPC .............. *G06F 3/065* (2013.01); *G06F 3/0604* (2013.01); *G06F 3/0683* (2013.01); *G06F 11/14* (2013.01); *G06F 11/1456* (2013.01); *G06F 11/2015* (2013.01); *G06F 11/2097* (2013.01); *G06F 13/409* (2013.01); *H04B 1/74* (2013.01); *H04L 41/0672* (2013.01); *H04L 41/0856* (2013.01); *H04L 63/00* (2013.01); *H04L 69/40* (2013.01); *H04L 12/10* (2013.01); *H04L 41/0846* (2013.01)

(58) Field of Classification Search
CPC ............ G06F 11/1456; G06F 11/2097; G06F 11/2015; G06F 11/20
USPC .............................. 711/161, 162; 714/6.1, 14
See application file for complete search history.

(56) References Cited

U.S. PATENT DOCUMENTS

| | | | |
|---|---|---|---|
| 2005/0052678 | A1 | 3/2005 | Urabe et al. |
| 2007/0192554 | A1* | 8/2007 | Higaki et al. ................. 711/162 |

(Continued)

FOREIGN PATENT DOCUMENTS

| | | |
|---|---|---|
| CN | 1852146 A | 10/2006 |
| CN | 2893948 Y | 4/2007 |
| CN | 101378449 A | 3/2009 |

OTHER PUBLICATIONS

Burton-Krahn, "HotSwap—Transparent Server Failover for Linux," Proceedings of LISA '02: Sixteenth Systems Administration Conference, pp. 205-212, USENIX Association, Philadelphia, Pennsylvania (Nov. 3-8, 2002).

*Primary Examiner* — Than Nguyen
(74) *Attorney, Agent, or Firm* — Leydig, Voit & Mayer, Ltd.

(57) ABSTRACT

Embodiments of the present invention disclose a device information backup method, device, and system for information backup between a first device and a second device. The first device and the second device are directly connected through a cable, and the first device acquires, from the second device through the cable, information to be backed up and back up the information to be backed up. In this way, information backup can be completed quickly and simply, and shortcomings of a poor reliability and a poor security of a pluggable storage medium are avoided.

11 Claims, 7 Drawing Sheets

(51) Int. Cl.
*G06F 11/14* (2006.01)
*H04B 1/74* (2006.01)
*H04L 12/24* (2006.01)
*H04L 29/14* (2006.01)
*H04L 29/06* (2006.01)
*G06F 13/40* (2006.01)
*H04L 12/10* (2006.01)

(56) References Cited

U.S. PATENT DOCUMENTS

| | | |
|---|---|---|
| 2008/0159325 A1 | 7/2008 | Chen et al. |
| 2012/0151085 A1 | 6/2012 | Singh et al. |
| 2012/0159078 A1* | 6/2012 | Doshi et al. ............... 711/133 |
| 2013/0054909 A1* | 2/2013 | Li et al. ..................... 711/162 |

* cited by examiner

DEVICE INFORMATION BACKUP METHOD, DEVICE, AND SYSTEM

CROSS-REFERENCE TO RELATED APPLICATIONS

This application is a continuation of International Patent Application No. PCT/CN2012/085029, filed on Nov. 22, 2012, which is hereby incorporated by reference in its entirety.

TECHNICAL FIELD

The present application relates to the field of computer communications, and in particular, to a device information backup method, device, and system.

BACKGROUND

Information, such as an Internet protocol (IP for short) address, a virtual local area network (VLAN for short), and a route, needs to be set on a relevant port of a computer device, in particular a network device, such as a switch, a router, or a server, according to a user requirement before the computer device works properly, so that the device can correctly bear a relevant service and complete a set function. Information such as a port IP address, a VLAN, and a routing table saved in a device is known as configuration information of the device, and the information is generally customized on a device at operating field and is indispensable. The configuration information is generally saved on a storage medium of the device. If the device becomes faulty and needs to be replaced with a same device, a standby device also requires the same configuration information to substitute the faulty device to work properly. Therefore, configuration information backup needs to be performed.

In an implementation manner in the prior art, a management port, such as a serial port or a network port, is arranged on a device. A serial port or a network port of a computer, such as a personal desktop computer or a laptop computer, is used to connect to a management port of a faulty device to login the faulty device, and configuration information is copied from a storage medium of the faulty device to the computer. Then, the computer is connected to a management port of a standby device by using the same method, the configuration information is copied from the computer to the standby device, and configuration information backup is completed. This backup method takes a long time, and is unacceptable if a service cannot be rapidly recovered after being interrupted in scenarios such as industrial control and monitoring. In addition, this backup method must use a computer to complete backup and requires professional maintenance personnel who is familiar with device maintenance and management.

In another implementation manner in the prior art, a pluggable storage medium, such as a universal serial bus (USB for short) flash disk (USB flash disk, U-disk for short), a secure digital card (SD card for short), or a multimedia card (MMC card for short) is configured on a device to save configuration information of the device. When the device operates properly, the configuration information is read from the pluggable storage medium configured on the device. When the device becomes faulty, the pluggable storage medium is removed from the device and inserted into a standby device, and then the standby device may obtain the configuration information. Alternatively, a device provides a USB interface, an MMC card interface, an SD card interface, or the like. A pluggable storage medium, such as a U-disk or an SD card, is inserted into a faulty device, and configuration information is copied to the pluggable storage medium through a simple operation, such as pressing a button or turning on a switch. Then, the pluggable storage medium is inserted into a standby device, the configuration information backed up on the pluggable storage medium can be copied to the standby device through a simple operation similarly, and configuration information backup is completed. Although this backup method is simple in operation, configuration information saved on a pluggable storage medium is easily damaged, lost, or the like, which results in low reliability. In addition, a pluggable storage medium is likely to be acquired by a third party, which results in problems such as a leak and malicious tampering of information, and therefore, the security of pluggable storage medium is low.

SUMMARY

In view of this, embodiments of the present invention provide a device information backup method, device, and system, which can provide simple, reliable, secure, and fast information backup between devices, thereby implementing fast fault recovery in a device fault scenario.

In a first aspect, an embodiment of the present invention provides a device, including a processor, a memory, a backup port, and a bus, where the processor, the memory, and the backup port are connected to the bus and communicate through the bus; the processor is configured to acquire, from a first device through the backup port, a cable, and a backup port of the first device, information to be backed up and write into the memory the information to be backed up; and the cable connects the backup port and the backup port of the first device.

In a first possible implementation manner of the first aspect, the device further includes a switching circuit, where the switching circuit is located on the bus, and the bus is a shared bus;

the memory keeps being connected to the backup port; and
the switching circuit is specifically configured to connect the processor to or disconnect the processor from the memory and the backup port according to a control signal.

With reference to the first possible implementation manner of the first aspect, in a second possible implementation manner of the first aspect, the processor is specifically configured to read, directly from a memory of the first device through the backup port, the cable, and the backup port of the first device, the information to be backed up and write into the memory the information to be backed up.

With reference to the first aspect, in a third possible implementation manner of the first aspect, the device further includes a switching circuit, where the switching circuit is located on the bus, and the bus is a point-to-point bus; and the switching circuit is specifically configured to connect any two of the processor, the memory, and the backup port according to a control signal.

With reference to the third possible implementation manner of the first aspect, in a fourth possible implementation manner of the first aspect, the processor is specifically configured to output a first control signal to the switching circuit so that the switching circuit connects the processor and the backup port, and read, directly from a memory of the first device through the backup port, the cable, and the backup port of the first device, the information to be backed up; and then output a second control signal to the switching circuit so that the switching circuit connects the processor and the memory, and write into the memory the information to be backed up.

With reference to any one of the first to fourth possible implementation manners of the first aspect, in a fifth possible implementation manner of the first aspect, the device further includes a power supply apparatus, configured to supply power to the device and supply power to the switching circuit and the memory of the first device through the cable, so that the processor is capable of accessing the memory of the first device, where the cable is specifically an electric cable.

In a sixth possible implementation manner of the first aspect, the processor is specifically configured to send a backup instruction to a processor of the first device through the backup port and the cable so that the processor of the first device reads, from the memory of the first device, the information to be backed up and transmits the information to be backed up to the device through the backup port of the first device and the cable; and receive, through the backup port, the information to be backed up.

With reference to the sixth possible implementation manner of the first aspect, in a seventh possible implementation manner of the first aspect, the device further includes a power supply apparatus, configured to supply power to the device and supply power to the processor and the memory of the first device through the cable.

With reference to the first aspect or any possible implementation manner of the first aspect, in an eighth possible implementation manner of the first aspect, the processor includes a buffer; and the buffer is configured to save, after the processor acquires the information to be backed up and before the information is stored in the memory, the information to be backed up.

In a second aspect, an embodiment of the present invention provides a device information backup method for information backup between a first device and a second device. The method includes:

acquiring, by the second device from the first device through a cable, information to be backed up and backing up the information to be backed up, where the second device is directly connected to the first device through the cable.

In a first possible implementation manner of the second aspect, the second device includes a processor, a memory, a backup port, and a bus, where the processor, the memory, and the backup port are connected to the bus and communicate through the bus;

the cable specifically connects the backup port and a backup port of the first device; and the acquiring, by the second device from the first device through the cable, information to be backed up and backing up the information to be backed up specifically includes:

reading, by the processor directly from a memory of the first device through the backup port, the cable, and the backup port of the first device, the information to be backed up; and writing, by the processor into the memory, the information to be backed up.

With reference to the first possible implementation manner of the second aspect, in a second possible implementation manner of the second aspect, the second device further includes a switching circuit, where the switching circuit is located on the bus, the bus is a shared bus; the memory keeps being connected to the backup port; and before the reading, by the processor directly from the memory of the first device through the backup port, the cable, and the backup port of the first device, the information to be backed up, the method further includes: connecting, by the switching circuit, the processor to the memory and the backup port according to a control signal, where a processor of the first device and the memory of the first device are in a disconnected state.

With reference to the first possible implementation manner of the second aspect, in a third possible implementation manner of the second aspect, the second device further includes a switching circuit, where the switching circuit is located on the bus, and the bus is a point-to-point bus;

before the reading, by the processor directly from the memory of the first device through the backup port, the cable, and the backup port of the first device, the information to be backed up, the method further includes: outputting, by the processor, a first control signal to the switching circuit, and connecting, by the switching circuit, the processor and the backup port according to the first control signal, where the backup port of the first device and the memory of the first device are in a connected state; and after the reading, by the processor directly from the memory of the first device through the backup port, the cable, and the backup port of the first device, the information to be backed up and before the writing, by the processor into the memory, the information to be backed up, the method further includes: outputting, by the processor, a second control signal to the switching circuit, and connecting, by the switching circuit, the processor and the memory according to the second control signal.

With reference to any one of the first to third possible implementation manners of the second aspect, in a fourth possible implementation manner of the second aspect, before the acquiring, by the second device from the first device through the cable, information to be backed up, the method further includes:

supplying, by the second device, power to a switching circuit and the memory of the first device through the backup port, the cable, and the backup port of the first device, so that the processor is capable of accessing the memory of the first device, where the cable is an electric cable.

In a fifth possible implementation manner of the second aspect, the second device includes a processor, a memory, a backup port, and a bus, where the processor, the memory, and the backup port are connected to the bus and communicate through the bus; and the acquiring, by the second device from the first device through the cable, information to be backed up and backing up the information to be backed up specifically includes:

sending, by the processor, a backup instruction to the first device through the backup port and the cable, so that a processor of the first device reads, from a memory of the first device, the information to be backed up; receiving, by the processor, the information to be backed up that is transmitted by the first device through the cable; and writing into the memory the information to be backed up.

With reference to the fifth possible implementation manner of the second aspect, in a sixth possible implementation manner of the second aspect, before the acquiring, by the second device from the first device through the cable, information to be backed up, the method further includes:

supplying, by the second device, power to the processor and the memory of the first device through the backup port, the cable, and the backup port of the first device, where the cable is specifically an electric cable.

According to a third aspect, an embodiment of the present invention provides a device information backup system, including a first device, the second device according to the first aspect or any one of the possible implementation manners of the first aspect, and a cable, where the first device is connected to the second device through the cable; and the second device is configured to acquire, from the first device through the cable, information to be backed up and back up the information to be backed up.

According to technical solutions provided in embodiments of the present invention, no intermediate medium, such as a computer or a pluggable storage medium, needs to be involved, two devices are directly connected through a cable, and therefore information backup between devices can be completed quickly and simply, shortcomings of a poor reliability and a poor security of the pluggable storage medium are avoided, and fast, simple, secure, and reliable backup is implemented for device information, thereby implementing fast fault recovery in a device fault scenario.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be noted that the technical solutions for device information backup provided in embodiments of the present invention may not only be used to back up information on a faulty device to a standby device when a device becomes faulty, but also be used in scenarios such as that where same devices are installed in batches for service expansion, and that where similar services are copied to another field, which are not limited in the present invention.

Figure 1:
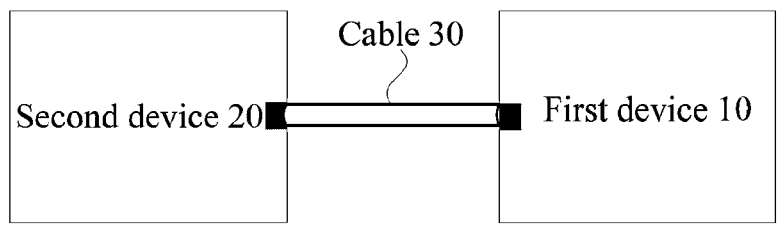
FIG. 1, FIG. 2, and FIG. 3 are schematic structural diagrams of a device information backup system according to embodiments of the present invention.

Refer to FIG. 1, which is a schematic structural diagram of a device information backup system according to an embodiment of the present invention. As shown in FIG. 1, the device information backup system includes a first device 10, a second device 20, and a cable 30. The first device 10 is connected to the second device 20 through the cable 30.

The second device 20 is configured to acquire, from the first device 10 through the cable 30, information to be backed up, for example, configuration information, and back up the information to be backed up.

The cable 30 may be an electric cable or an optical cable.

Optionally, the second device 20 is further configured to supply power to the first device 10 through the cable 30, and the cable 30 is an electric cable.

The first device 10 and the second device 20 may be computer devices of various types, such as routers, switches, and servers. Parts of the first device 10 and the second device 20 that are related to a technical solution of the present invention have the same structure; and the first device 10 and the second device 20 may be devices of a same type.

In a device fault scenario, the first device 10 is equivalent to a faulty device, the second device 20 is equivalent to a standby device, and the standby device may directly back up configuration information of the faulty device to its own memory through the cable, thereby quickly entering a working state and recovering from a fault.

According to the device information backup system provided in this embodiment, no intermediate medium, such as a computer or a pluggable storage medium, needs to be involved, two devices are directly connected through a cable, information backup between devices can be completed quickly and simply, and shortcomings of a poor reliability and a poor security of the pluggable storage medium are avoided, thereby implementing fast, simple, secure, and reliable backup for device information. When a device becomes faulty, configuration information of the faulty device can be quickly backed up to a standby device, thereby implementing fast fault recovery.

Figure 2:
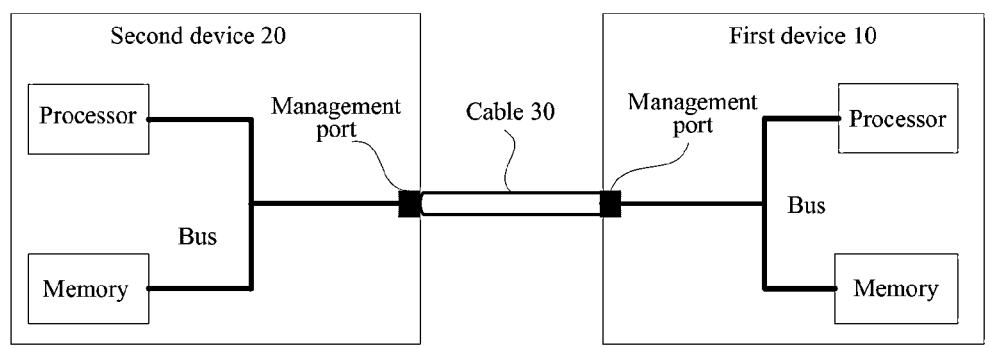
Figure 3:
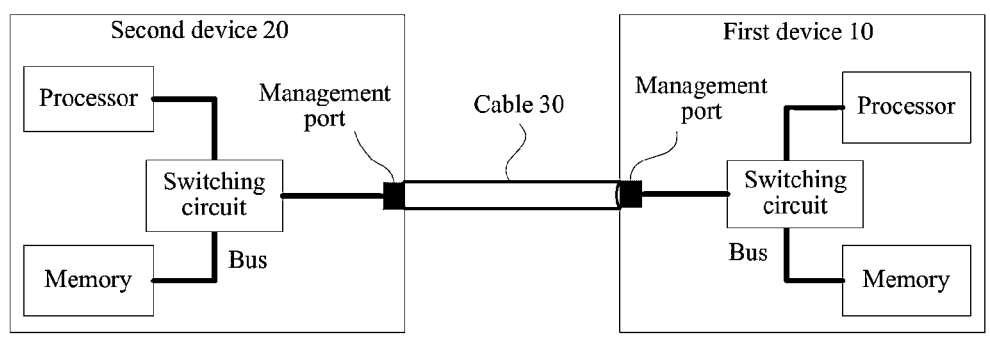

Then, based on the device information backup system shown in FIG. 1 of the present invention, the following describes in detail a device information backup system provided in an embodiment of the present invention with reference to FIG. 2 and FIG. 3. The device information backup system includes a first device 10, a second device 20, and a cable 30, where parts of the first device 10 and the second device 20 that are related to a technical solution of the present invention have the same structure, and the first device 10 and the second device 20 may be devices of a same type. Specifically, the second device 20 includes a processor, a memory, a backup port, and a bus, where the processor, the memory, and the backup port are connected to the bus and communicate through the bus. Similarly, the first device 10 includes a processor, a memory, a backup port, and a bus, where the processor, the memory, and the backup port are connected to the bus and communicate through the bus.

The first device 10 is connected to the second device 20 through the cable 30. Specifically, a backup port of the first device 10 is connected to a backup port of the second device 20 through the cable 30.

The second device 20 is configured to acquire, from the first device 10 through the cable 30, information to be backed up, for example, configuration information, and back up the information to be backed up. Specifically, a processor of the second device 20 is configured to acquire, from the first device 10 through the backup port of the second device 20, the cable 30, and the backup port of the first device 10, the information to be backed up and write into the memory of the second device 20 the information to be backed up.

The processor includes a central processing unit (central processing unit, CPU for short), a network processor (network processor, NP for short), a digital signal processor (digital Signal processor, DSP for short), an application specific integrated circuit (application special integrated circuit, ASIC for short), a field programmable gate array (field programmable gate array, FPGA for short), a microprocessor, and the like. The memory may be a non-volatile memory (non-volatile memory, NVM for short), including an electrically erasable and programmable read only memory (electrically erasable and programmable read only memory, EEPROM for short) and a flash memory (Flash). The backup port is a port for inputting/outputting information to be backed up in the embodiment of the present invention. The backup port may be a dedicated port that is configured for implementing the embodiment of the present invention, or an existing port on a device.

The second device 20 further includes a power supply apparatus, configured to supply power to the second device 20. Similarly, the first device 10 further includes a power supply apparatus, configured to supply power to the first device 10.

In a possible implementation manner, as shown in FIG. 2, processors, backup ports, and memories are connected through buses for communication, and the processors may directly access the memories. The processor of the second device 20 specifically sends a backup instruction to the processor of the first device 10 through the backup port of the second device 20 and the cable 30. After receiving the backup instruction from the backup port of the first device 10, the processor of the first device 10 reads, from the memory of the first device 10, the information to be backed up and transmits, to the second device 20 through the backup port of the first device 10 and the cable 30, the information to be backed up. The processor of the second device 20 receives, through the backup port of the second device 20, the information to be backed up and writes into the memory of the second device 20 the information to be backed up. The processors are specifically dedicated processors for implementing the present invention, including a field programmable gate array (FPGA) and a microprocessor, such as a single-chip microcomputer. The power supply apparatus of the second device 20 is further configured to supply power to part of the first device 10 through the cable 30, that is, to supply power to the processor and the memory of the first device 10, so that the processor of the first device 10 operates and the memory of the first device 10 is accessible. In this case, the cable 30 is specifically an electric cable. The processors of the first device and the second device in the embodiment of the present invention are implemented by using dedicated processors, such as single-chip microcomputers, instead of main processors for the devices to operate. In this way, the processor of the first device and the processor of the second device can communicate directly and access respective memories, implementation is flexible, and costs and power consumption are low.

In another possible implementation manner, as shown in FIG. 3, the second device 20 further includes a switching circuit, and similarly, the first device 10 also includes a switching circuit, where the switching circuits are located on the buses and configured to connect or disconnect the processors, memories, and backup ports. Specifically, the processor of the second device 20 reads, directly from the memory of the first device 10 through the backup port of second device 20, the cable 30, and the backup port of the first device 10, the information to be backed up and writes, into the memory of the second device 20, the information to be backed up. When information in the first device 10 needs to be backed up to the second device 20, the first device 10 and the second device 20 are connected through the cable 30. In this case, an information output device and an information input device need to be selected first before the information can be backed up. This may be implemented by using the following two manners:

In one manner, the second device 20 is further configured to supply power to part of the first device 10 through the cable 30, where the cable 30 is an electric cable. Specifically, the first device 10 is powered off, that is, power supply for the first device 10 is stopped; the second device 20 is powered on, that is, the power supply apparatus of the second device 20 supplies power to the second device 20; and the power supply apparatus of the second device 20 simultaneously supplies power to part of the first device 10 through the cable 30, that is, supplies power to the switching circuit and the memory of the first device 10. No power is supplied to the processor of the first device 10, and therefore the processor of the first device 10 does not work and the first device 10 automatically becomes an information output device. However, the processor of the second device 20 operates and automatically identifies that the second device 20 is an information input device. In this case, even in a situation where a power supply apparatus of the first device 10 becomes faulty, information backup may still be completed by supplying power, by the second device 20, to part of the first device 10.

In another manner, buttons, switches, or function menus are configured on the first device 10 and the second device 20, and power keeps being supplied to the first device 10 and the second device 20 separately. The second device 20 is selected as an information input device and the first device 10 is selected as an information output device by using the buttons, switches, or function menus configured on the devices.

It should be noted that when the first device 10 and the second device 20 are in a normal working state, the switching circuits keep connecting the processors and the memories, and the processors can access the memories normally through the buses.

According to the technical solution provided in this embodiment, no intermediate medium, such as a computer or a pluggable storage medium, needs to be involved, two devices are directly connected through a cable, a memory may be correctly accessed through a switching circuit in a device, information backup between devices can be completed quickly and simply, and shortcomings of a poor reliability and a poor security of the pluggable storage medium are avoided, thereby implementing fast, simple, secure, and reliable backup for device information. When a device becomes faulty, a standby device can directly access a memory of the faulty device, and therefore configuration information of the faulty device can be quickly backed up to the standby device, thereby implementing fast fault recovery.

Based on the device information backup systems shown in FIG. 1 to FIG. 3 of the present invention, the following specifically describes a second device 20.

Figure 4:
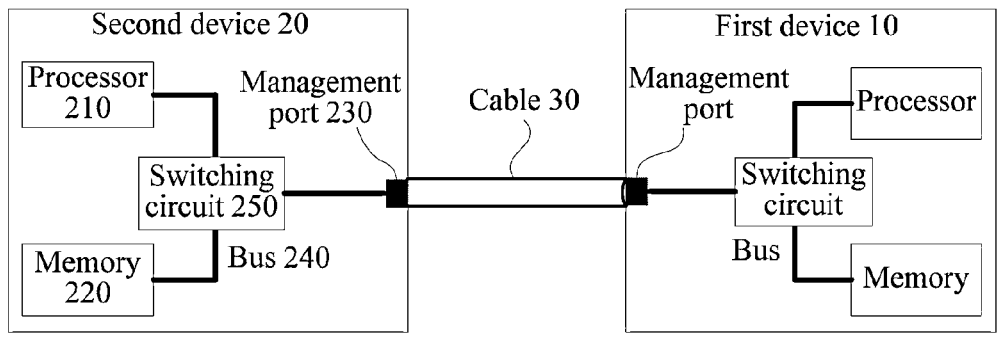
FIG. 4 and FIG. 5 are schematic structural diagrams of a second device 20 according to embodiments of the present invention.

Refer to FIG. 4, which is a schematic structural diagram of a second device 20 according to an embodiment of the present invention, and the second device 20 includes a processor 210, a memory 220, a backup port 230, and a bus 240.

The processor 210 is configured to read, directly from a memory of the first device 10 through the backup port 230, a cable 30, and a backup port of a first device 10, information to be backed up and write into the memory 220 the information to be backed up. The backup port 230 is connected to the backup port of the first device 10 through the cable 30, and the cable 30 may be an electric cable or an optical cable.

The second device 20 further includes a switching circuit 250, and the switching circuit 250 is located on the bus 240 and configured to connect or disconnect the processor 210, the memory 220, and the backup port 230.

The second device 20 may be a computer device of various types, such as a router, a switch, or a server. The processor 210 includes a central processing unit (CPU), a network processor (NP), a digital signal processor (DSP), an application-specific integrated circuit (ASIC), a field programmable gate array (FPGA), a microprocessor, and the like. The memory 220 may be a non-volatile memory (NVM), including an electrically erasable and programmable read only memory (EEPROM) and a flash memory (Flash).

The bus 240 includes a shared bus and a point-to-point bus. The shared bus allows all receivers and transmitters to simultaneously connect to the bus, for example, an inter-integrated circuit (inter-integrated circuit, I2C for short) bus, a controller area network (controller area network, CAN for short) bus, or an RS-485 bus. The point-to-point bus allows only one receiver and one transmitter to connect to the bus at the same time, for example, a serial peripheral interface (serial peripheral interface, SPI for short) bus, a universal asynchronous receiver transmitter (universal asynchronous receiver transmitter, UART for short) bus, or a universal serial bus (universal serial bus, USB for short). The backup port 230 is a port for inputting/outputting information to be backed up in the embodiment of the present invention. The backup port 230 may be a dedicated port that is configured for implementing the embodiment of the present invention, or an existing port on the second device 20.

Figure 5:
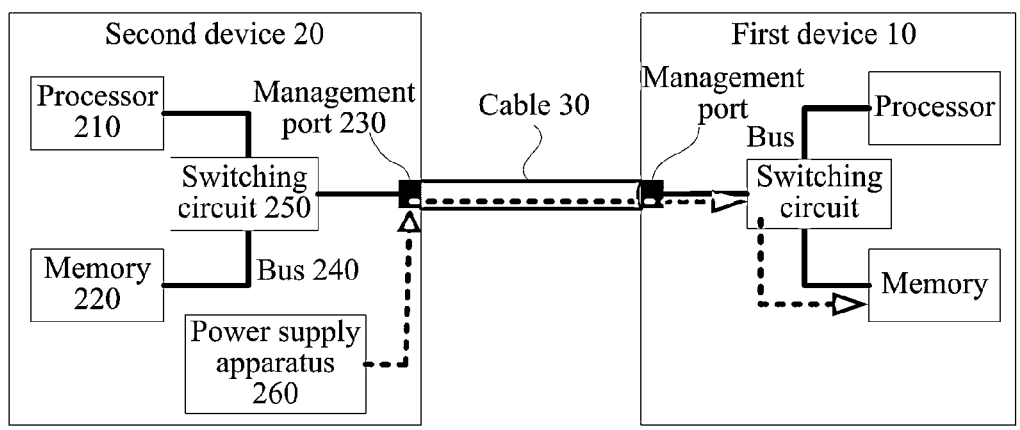

As shown in FIG. 5, the second device 20 further includes a power supply apparatus 260, configured to supply power to the second device 20. Optionally, the power supply apparatus 260 may be logically connected to the processor 210 through a power management system, thereby implementing functions such as power consumption management through the power management system. When information in the first device 10 needs to be backed up to the second device 20, after the first device 10 and the second device 20 are connected through the cable 30, an information output device and an information input device need to be selected first before the information can be backed up. This may be implemented by using the following two manners:

In one manner, the second device 20 is further configured to supply power to part of the first device 10 through the cable 30, where the cable 30 is an electric cable. Specifically, the first device 10 is powered off, the second device 20 is powered on, and the power supply apparatus 260 supplies power to the second device 20 and is further configured to supply power to part of the first device 10 through the cable 30, that is, to supply power to a switching circuit and the memory of the first device 10 through the backup port 230, the cable 30, and the backup port of the first device 10. No power is supplied to a processor of the first device 10, and therefore the processor of the first device 10 does not work and the first device 10 automatically becomes an information output device. However, the processor of the second device 20 operates and automatically identifies that the second device 20 is an information input device. In this case, even in a situation where a power supply apparatus of the first device 10 becomes faulty, information backup may still be completed by supplying power by the second device 20, to part of the first device 10.

In another manner, buttons, switches, or function menus are configured on the first device 10 and the second device 20, and power keeps being supplied to the first device 10 and the second device 20 separately. The second device 20 is selected as an information input device and the first device 10 is selected as an information output device by using the buttons, switches, or function menus configured on the devices.

Further optionally, the processor 210 includes a buffer 212; and the buffer is configured to save, after the processor 210 acquires the information to be backed up and before the information is stored in the memory 220, the information to be backed up. Accordingly, the processor 210 is specifically configured to read, directly from the memory of the first device 10 through the backup port 230, the cable 30, and the backup port of the first device 10, the information to be backed up, store in the buffer 212 the information to be backed up, and then write, from the buffer 212 into the memory 220, the information to be backed up. It should be understood that if the buffer 212 is large enough, the processor 210 may read, from the first device 10 to the buffer 212 one time, the information to be backed up and then write, from the buffer 212 into the memory 220, the information to be backed up; and if the buffer 212 is not large enough, the processor 210 needs to perform read and write operations for multiple times to write into the memory 220 the information to be backed up, that is, the processor 210 reads, from the memory of the first device 10 to the buffer 212 at a time, partial information to be backed up and writes into the memory 220 the partial information to be backed up in the buffer 212 until all information to be backed up is written into the memory 220. Certainly, the processor 210 may further have no buffer 212. In this case, the processor 210 performs read and write operations byte by byte for multiple times to write into the memory 220 the information to be backed up, that is, the processor 210 reads a byte of information from the memory of the first device 10 at a time and writes the byte of information into the memory 220 until the information to be backed up is written into the memory 220. Whether the processor 210 having the buffer 212 or the size of the buffer 212 is not limited in the present invention, as long as the technical solution of the present invention can be implemented.

In a possible implementation manner, the bus 240 is a point-to-point bus, for example, an SPI bus. The switching circuit 250 is specifically configured to control, according to a control signal, a connection between any two of the processor 210, the memory 220, and the backup port 230 that is, at any time, either the processor 210 is connected to the memory 220, or the processor 210 is connected to the backup port 230, or the memory 220 is connected to the backup port 230. The processor 210 is specifically configured to output a first control signal to the switching circuit 250, so that the switching circuit 250 connects the processor 210 and the backup port 230, and read, directly from the memory of the first device 10 through the backup port 230, the cable 30, and the backup port of the first device 10, the information to be backed up; and output a second control signal to the switching circuit 250, so that the switching circuit 250 connects the processor 210 and the memory 220, and write into the memory 220 the information to be backed up. If the processor 210 includes a buffer, the processor 210 saves, into the buffer the information to be backed up, after acquiring the information to be backed up and before storing into the memory 220 the information to be backed up.

In another possible implementation manner, the bus 240 is a shared bus, for example, an I2C bus. The memory 220 keeps being connected to the backup port 230. The memory 220 may be directly connected to the backup port 230 through the bus 240. Accordingly, the switching circuit 250 is specifically configured to connect the processor 210 to, or disconnect the processor 210 from, the memory 220 and the backup port 230, according to a control signal. Specifically, when the second device 20 is powered on, the switching circuit 250 is switched on according to a third control signal, so that the processor 210 connects the memory 220 and the backup port 230. When the second device 20 is powered off, the switching circuit 250 is switched off according to a fourth control signal, so that the processor 210 is disconnected from the memory 220 and the backup port 230. The processor 210 is specifically configured to read, directly from the memory of the first device 10 through the backup port 230, the cable 30, and the backup port of the first device 10, the information to be backed up and write into the memory 220 the information to be backed up. If the processor 210 includes a buffer, the processor 210 saves, into the buffer the information to be backed up, after acquiring the information to be backed up and before writing into the memory 220 the information to be backed up. Optionally, when the bus 240 is a shared bus, the switching circuit 250 may even be omitted in some situations.

It should be noted that when the second device 20 is in a working state, the processor 210 keeps being connected to the memory 220 through the switching circuit 250, and the processor 210 can normally access the memory 220 through the bus 240.

Further optionally, the memory 220 is further configured to store a program code, where the program code includes a computer operation instruction, and the processor 210 may perform various function applications and data processing of the second device 20 by running the computer operation instruction stored in the memory 220. The memory 220 may include a program storage area and a data storage area, where the program storage area may store an operating system, a software program, and the like, and the data storage area may store data used by a device, such as configuration information of the device.

It should be noted that in the embodiment of the present invention, parts of the second device 20 and the first device 10 that are related to the present invention have the same structure, and they may also implement a technical solution of device information backup provided in the present invention. In this case, according to a specific application scenario, one device acts as an information output device, and another acts as an information input device. Particularly, the second device 20 may be the same device as the first device 10.

A person skilled in the art should understand that the embodiment of the present invention shows merely a partial structure, which is related to the present invention, in the second device 20, and more components than shown in this figure or a different component arrangement may further be included in the second device 20.

In the technical solution provided in this embodiment, no intermediate medium, such as a computer or a pluggable storage medium, needs to be involved, two devices are directly connected through a cable, a processor can be ensured, through control by a switching circuit, to correctly access a memory, information backup between devices can be completed quickly and simply, and shortcomings of a poor reliability and a poor security of the pluggable storage medium are avoided, thereby implementing fast, simple, secure, and reliable backup for device information. When a device becomes faulty, a standby device can directly access a memory of the faulty device, and therefore configuration information of the faulty device can be quickly backed up to the standby device, thereby implementing fast fault recovery.

Figure 6:
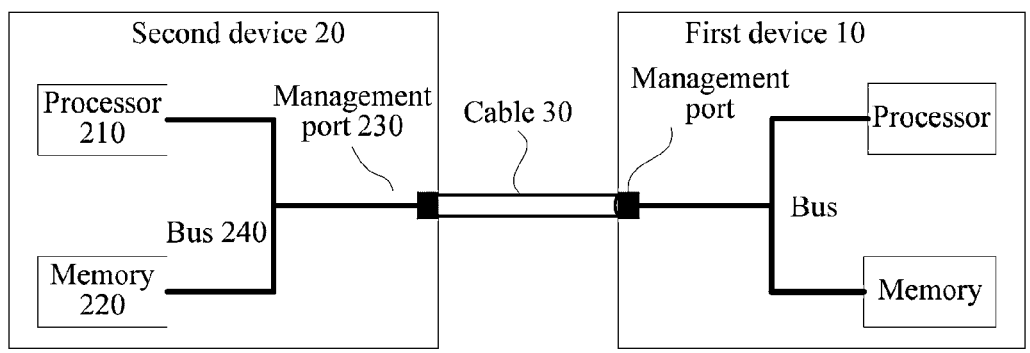
FIG. 6 is a schematic structural diagram of another second device 20 according to an embodiment of the present invention.

Refer to FIG. 6, which is a schematic structural diagram of another second device 20 according to an embodiment of the present invention. The second device 20 includes a processor 210, a memory 220, a backup port 230, and a bus 240, where the processor 210, the memory 220, and the backup port 230 are connected through the bus 240 for communication, and the processor 210 may directly access the memory 220.

The processor 210 is configured to acquire, directly from the first device 10 through the backup port 230, a cable 30, and a backup port of a first device 10, information to be backed up and write into the memory 220 the information to be backed up. The backup port 230 is connected to the backup port of the first device 10 through the cable 30, and the cable 30 may be an electric cable or an optical cable.

The second device 20 may be a computer device of various types, such as a router, a switch, or a server. The processor 210 is specifically a dedicated processor for implementing the present invention, including a microprocessor, such as a single-chip microcomputer, a field programmable gate array (FPGA), or an application-specific integrated circuit (ASIC). The memory 220 may be a non-volatile memory (NVM), including an electrically erasable and programmable read only memory (EEPROM) and a flash memory (Flash). The backup port 230 is a port for inputting/outputting information to be backed up in the embodiment of the present invention. The backup port 230 may be a dedicated port that is configured for implementing the embodiment of the present invention, or an existing port on a device.

The second device 20 further includes a power supply apparatus 260, configured to supply power to the second device 20. Optionally, the power supply apparatus 260 may be logically connected to the processor 210 through a power management system, thereby implementing functions such as power consumption management through the power management system.

The processor 210 is specifically configured to send a backup instruction to a processor of the first device 10 through the backup port 230 and the cable 30 to instruct the processor of the first device 10 to read, from a memory of the first device 10, the information to be backed up and transmit, to the second device 20 through the backup port of the first device 10 and the cable 30, the information to be backed up; receive, through the backup port 230, the information to be backed up; and write into the memory 220 the information to be backed up.

It should be understood that the processor of the first device and the processor of the second device are implemented by using dedicated processors, such as single-chip microcomputers, so that the processor of the first device and the processor of the second device can communicate directly and access respective memory. Accordingly, after receiving the backup instruction from the backup port of the first device 10, the processor of the first device 10 reads, from the memory of the first device 10 according to the backup instruction, the information to be backed up and transmits, to the second device 20 through the backup port of the first device 10 and the cable 30, the information to be backed up.

Further optionally, the power supply apparatus 260 is further configured to supply power to part of the first device 10 through the cable 30, that is, to supply power to the processor and the memory of the first device 10, so that the processor of the first device 10 operates and the memory of the first device 10 is accessible. In this case, the cable 30 is specifically an electric cable.

The processors of the first device and the second device in the embodiment of the present invention are implemented by using dedicated processors, such as single-chip microcomputers, instead of main processors for the devices to operate. In this way, the processor of the first device and the processor of the second device can communicate directly and access respective memory, implementation is flexible, and costs and power consumption are low.

Figure 7:
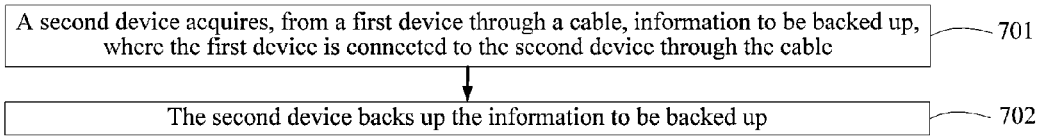
FIG. 7 is a flowchart of a device information backup method according to an embodiment of the present invention.

Refer to FIG. 7, which is a flowchart of a device information backup method according to an embodiment of the present invention, and the device information backup method is used for information backup between a first device and a second device. The device information backup method includes:

701. The second device acquires, from the first device through a cable, information to be backed up, where the first device is connected to the second device through the cable.

702. The second device backs up the information to be backed up.

The cable may be an electric cable or an optical cable. The second device may store into a memory the information to be backed up, for example, configuration information.

In a possible implementation manner, the cable is specifically an electric cable, and before the second device acquires, from the first device through a cable, information to be backed up, the method further includes:

supplying, by the second device, power to part of the first device through the cable. In this case, even in a situation where the first device becomes faulty and cannot be powered on, information backup may still be completed by supplying power, by the second device, to part of the first device.

The second device may be a computer device of various types, such as a router, a switch, or a server. Optionally, the first device may be the same device as the second device.

In a device fault scenario, the first device is equivalent to a faulty device, the second device is equivalent to a standby device, and the standby device may directly back up configuration information of the faulty device to itself through the cable, thereby quickly entering a working state and recovering from a fault.

In the technical solution provided in this embodiment, no intermediate medium, such as a computer or a pluggable storage medium, needs to be involved, two devices are directly connected through a cable, information backup between devices can be completed quickly and simply, and shortcomings of a poor reliability and a poor security of the pluggable storage medium are avoided, thereby implementing fast, simple, secure, and reliable backup for device information. When a device becomes faulty, configuration information of the faulty device can be quickly backed up to a standby device, thereby implementing fast fault recovery.

Based on the method shown in FIG. 7, the following further describes in detail a device information backup method according to the present invention.

Figure 8:
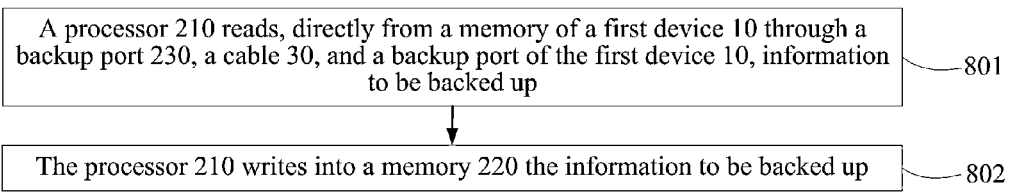
FIG. 8 is a flowchart of another device information backup method according to an embodiment of the present invention.

Refer to FIG. 8, which is a flowchart of another device information backup method according to an embodiment of the present invention. The device information backup method is used for information backup between a first device 10 and a second device 20, and the first device 10 is connected to the second device 20 through a cable 30. The second device 20 includes a processor 210, a memory 220, a backup port 230, and a bus 240. As shown in FIG. 8, the device information backup method includes:

801. The processor 210 reads, directly from a memory of the first device 10 through the backup port 230, the cable 30, and a backup port of the first device 10, information to be backed up.

802. The processor 210 writes into the memory 220 the information to be backed up.

The cable 30 may be an electric cable or an optical cable. Specifically, the cable 30 connects the backup port 230 and the backup port of the first device 10.

The second device 20 further includes a switching circuit 250, and the switching circuit 250 is located on the bus 240 and configured to connect or disconnect the processor 210, the memory 220, and the backup port 230. Specifically, for a structure and a function of the second device 20, reference may be made to the embodiment shown in FIG. 4 of the present invention.

As shown in FIG. 5 of the present invention, the second device 20 further includes a power supply apparatus 260, which supplies power to the second device 20.

When information in the first device 10 needs to be backed up to the second device 20, the first device 10 and the second device 20 need to be connected through the cable 30 first, and then an information output device and an information input device need to be selected before the information can be backed up. This may be implemented by using the following two manners:

In one manner, the second device 20 supplies power to part of the first device 10 through the cable 30. Specifically, the first device 10 is powered off, that is, power supply for the first device 10 is stopped; the second device 20 is powered on, that is, the power supply apparatus of the second device 20 supplies power to the second device 20; and the second device 20 simultaneously supplies power to part of the first device 10 through the cable 30. No power is supplied to a processor of the first device 10, and therefore the processor of the first device 10 does not work and the first device 10 automatically becomes an information output device. However, the processor of the second device 20 operates and automatically identifies that the second device 20 is an information input device. Before 801, the method further includes that: the second device 20 supplies power to part of the first device 10 through the cable 30. Specifically, the power supply apparatus 260 supplies power to the processor and the memory of the first device 10 through the backup port 230, the cable 30, and the backup port of the first device 10, where the cable 30 is specifically an electric cable. In this case, even in a situation where the first device 10 becomes faulty and cannot be power on, information backup may still be completed by supplying power, by the second device 20, to part of the first device 10.

In another manner, buttons, switches, or function menus are configured on the first device 10 and the second device 20, and power keeps being supplied to the first device 10 and the second device 20 separately. The second device 20 is selected as an information input device and the first device 10 is selected as an information output device by using the buttons, switches, or function menus configured on the devices.

Figure 9:
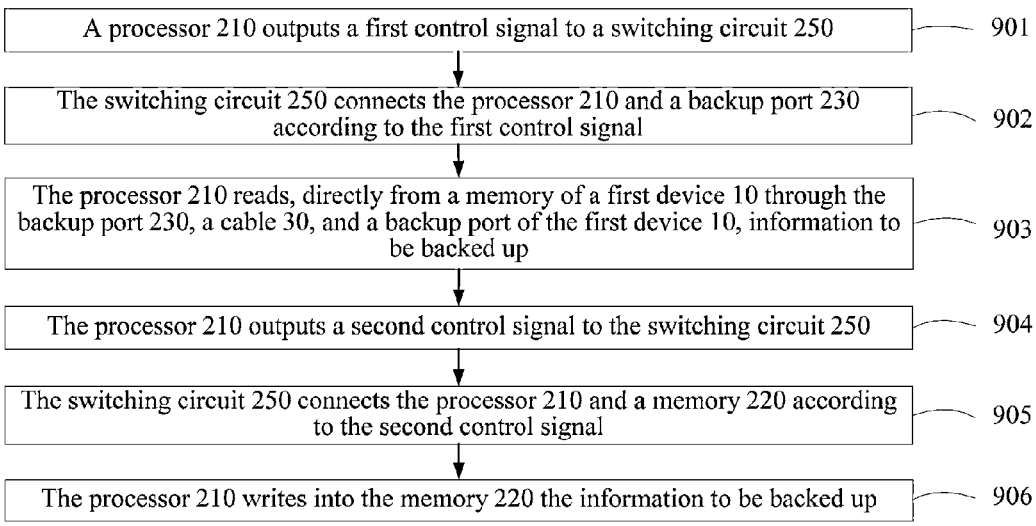
FIG. 9 is a flowchart of still another device information backup method according to an embodiment of the present invention.

When the bus 240 is a point-to-point bus, for example, an SPI bus, the switching circuit controls a connection between any two of the processor, the memory, and the backup port according to a control signal, that is, at any time, either the processor 210 is connected to the memory 220, or the processor 210 is connected to the backup port 230, or the memory 220 is connected to the backup port 230. Before 801, the method further includes that: the processor 210 outputs a first control signal to the switching circuit 250, and the switching circuit 250 connects the processor 210 and the backup port 230 according to the first control signal. After 801 and before 802, the method further includes that: the processor 210 outputs a second control signal to the switching circuit 250, and the switching circuit 250 connects the processor 210 and the memory 220 according to the second control signal. Refer to FIG. 9, which is a flowchart of still another device information backup method according to an embodiment of the present invention. The method includes:

901. The processor 210 outputs the first control signal to the switching circuit 250.

902. The switching circuit 250 connects the processor 210 and the backup port 230 according to the first control signal.

903. The processor 210 reads, directly from the memory of the first device 10 through the backup port 230, the cable 30, and the backup port of the first device 10, information to be backed up.

904. The processor 210 outputs the second control signal to the switching circuit 250.

905. The switching circuit 250 connects the processor 210 and the memory 220 according to the second control signal.

906. The processor 210 writes into the memory 220 the information to be backed up.

When the bus 240 is a shared bus, for example, an I2C bus, the memory 220 keeps being connected to the backup port 230, and the memory 220 may be directly connected to the backup port 230 through the bus 240. Before 801, the method further includes that: the switching circuit 250 connects the processor 210 to the memory 220 and the backup port 230 according to a control signal. For example, when the second device 20 is powered on, the switching circuit 250 is switched on according to a third control signal, so that the processor 210 connects the memory 220 and the backup port 230; and when the second device 20 is powered off, the switching circuit 250 is switched off according to a fourth control signal, so that the processor 210 is disconnected from the memory 220 and the backup port 230. The first device 10 acts as an information output device, and the processor of the first device is disconnected from the memory of the first device, that is, the processor and the memory of the first device are in a disconnected state. This may be implemented by using the preceding two manners.

The processor 210 may further include a buffer; and the processor 210 saves, into the buffer the information to be backed up, after acquiring information to be backed up and before storing the information into the memory 220. It should be understood that if the buffer is large enough, the processor 210 may read, from the first device 10 to the buffer one time, the information to be backed up and then write, from the buffer into the memory 220, the information to be backed up; and if the buffer is not large enough, the processor 210 needs to perform read and write operations for multiple times to write into the memory 220 the information to be backed up, that is, the processor 210 reads, from the memory of the first device 10 to the buffer at a time, partial information to be backed up and writes into the memory 220 the partial information to be backed up in the buffer until all information to be backed up is written into the memory 220. Certainly, the processor 210 also may not have a buffer. In this case, the processor 210 performs read and write operations byte by byte for multiple times to write into the memory 220 the information to be backed up, that is, the processor 210 reads a byte of information from the memory of the first device 10 at a time and writes the byte of information into the memory 220 until all information to be backed up is written into the memory 220. Whether the processor 210 having a buffer or the size of the buffer is not limited in the present invention, as long as the technical solution of the present invention can be implemented.

It should be noted that when the second device 20 is in a working state, the switching circuit 250 keeps connecting the processor 210 and the memory 220, and the processor 210 can normally access the memory 220 through the bus 240. The memory 220 may further be configured to store a program code, where the program code includes a computer operation instruction, and the processor 210 performs various function applications and data processing of the second device 20 by running the computer operation instruction stored in the memory 220. The memory 220 may include a program storage area and a data storage area, where the program storage area may store an operating system, a software program, and the like, and the data storage area may store data used by a network device, such as configuration information of the device.

In the technical solution provided in this embodiment, no intermediate medium, such as a computer or a pluggable storage medium, needs to be involved, two devices are directly connected through a cable, a processor can be ensured, through control by a switching circuit, to correctly access a memory, information backup between devices can be completed quickly and simply, and shortcomings of a poor reliability and a poor security of the pluggable storage medium are avoided. When a device becomes faulty, the second device in the embodiment of the present invention is equivalent to a faulty device, the first device is equivalent to a standby device, and in the device information backup method provided in the present invention, the standby device can directly access a memory of the faulty device to quickly back up configuration information of the faulty device to the standby device, thereby implementing fast fault recovery. The device information backup method provided in the embodiment of the present invention is simple and efficient, and its reliability and security are high.

Figure 10:
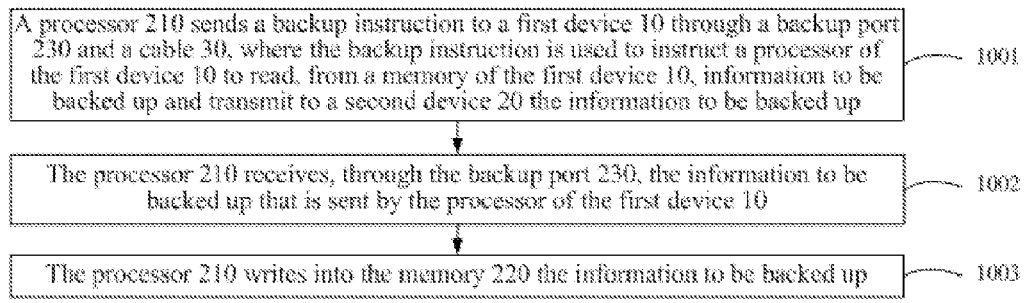
FIG. 10 is a flowchart of still another device information backup method according to an embodiment of the present invention.

Refer to FIG. 10, which is a flowchart of still another device information backup method according to an embodiment of the present invention. The device information backup method is used for information backup between a first device 10 and a second device 20, and the first device 10 is connected to the second device 20 through a cable 30. The second device 20 includes a processor 210, a memory 220, a backup port 230, and a bus 240. Specifically, for a structure and a function of the second device 20, reference may be made to the embodiment shown in FIG. 6 of the present invention. As shown in FIG. 10, the device information backup method includes:

1001. The processor 210 sends a backup instruction to the first device 10 through the backup port 230 and the cable 30, where the backup instruction is used to instruct a processor of the first device 10 to read, from a memory of the first device 10, information to be backed up and transmit to the second device 20 the information to be backed up.

After receiving the backup instruction from a backup port of the first device 10, the processor of the first device 10 reads, from the memory of the first device 10 according to the backup instruction, the information to be backed up and transmits, to the second device 20 through the backup port of the first device 10, the information to be backed up.

1002. The processor 210 receives, through the backup port 230, the information to be backed up that is sent by the processor of the first device 10.

1003. The processor 210 writes into the memory 220 the information to be backed up.

It should be understood that the processor of the first device and the processor of the second device are implemented by using dedicated processors, such as single-chip microcomputers, so that the processor of the first device and the processor of the second device can communicate directly and access respective memories.

Optionally, before the second device acquires, from the first device through the cable, information to be backed up, the method further includes:

supplying, by the second device, power to the processor and the memory of the first device through the backup port, the cable, and the backup port of the first device, where the cable is specifically an electric cable.

The processors of the first device and the second device in the embodiment of the present invention are implemented by using dedicated processors, such as single-chip microcomputers, instead of main processors for the devices to operate. In this way, the processor of the first device and the processor of the second device can communicate directly and access respective memories, implementation is flexible, and costs and power consumption are low.

The following takes configuration information backup in a device fault scenario as an example to describe a technical solution of device information backup provided in an embodiment of the present invention by using two specific examples. In a device fault scenario, a first device 10 is a faulty device, a second device 20 is a standby device, and the faulty device and the standby device are devices of a same type.

Figure 11:
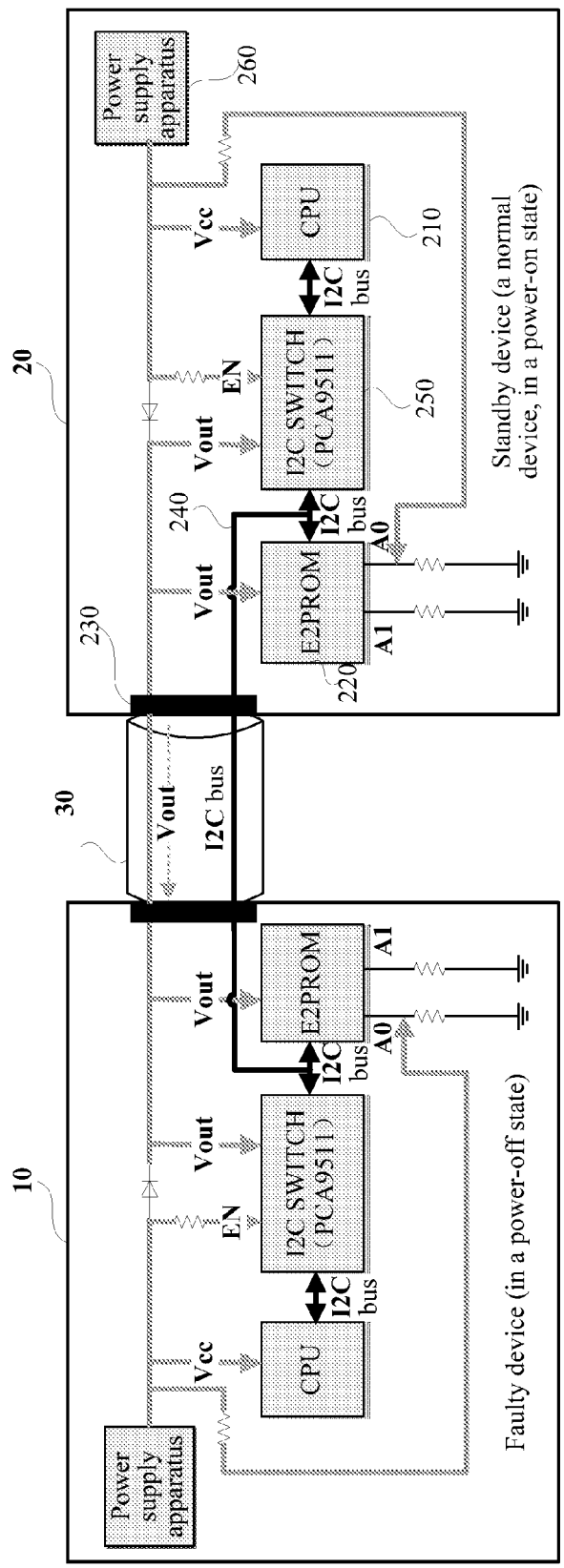
FIG. 11 is a schematic structural diagram of hardware connections of a standby device 20 using an I2C bus according to an embodiment of the present invention.

Refer to FIG. 11, which is a schematic diagram of a hardware structure of a standby device 20 using an I2C bus according to an embodiment of the present invention, where a processor is a CPU 210, a memory is an EEPROM 220 using an I2C bus interface, a backup port 230 may be a serial port, a bus is an I2C bus 240, and a switching circuit is an I2C switching device I2C SWITCH 250, for example, a PCA9511. As shown in FIG. 11, the EEPROM 220 is directly connected to the backup port 230 through the I2C bus 240, and the faulty device 10 and the standby device 20 have a same hardware structure and are connected through a cable 30.

In this embodiment, the faulty device 10 is in a power-off state, and therefore its CPU does not work, its Vcc has no power, which is indicated by a logic 0, its I2C SWITCH (PCA9511) is disabled and disconnected from the I2C bus. An E2PROM of the faulty device 10 is a memory that saves configuration information. The standby device 20 is in a power-on state, the CPU 210 works normally, its Vcc is powered on, which is indicated by a logic 1, the I2C SWITCH (PCA9511) 250 is enabled. The CPU 210 is connected to the I2C bus 240 by using the I2C SWITCH (PCA9511) 250 and is capable of accessing a component on the bus 240. A least significant bit address A0 of the E2PROM 220 is pulled up by the power supply Vcc to a high level, and the least significant bit A0 of the address is 1. The standby device 20 supplies power to part of the faulty device through the cable 30 and the backup port 230, and a diode ensures that power is supplied, through the cable, only to the E2PROM and the I2C SWITCH (PCA9511). After the E2PROM of the faulty device 10 is powered through the standby device 20, its address A0 is pulled down to the ground, and the least significant bit A0 of the address is 0. Therefore, the E2PROM 220 of the standby device 20 and the E2PROM of the faulty device 10 are of different addresses, and the CPU 210 in the standby device 20 may access the memories of the two devices and copy configuration information in the E2PROM of the faulty device 10 to the E2PROM 220 of the standby device 20 to complete configuration information backup.

In the technical solution provided in this embodiment, no intermediate medium, such as a computer or a pluggable storage medium, needs to be involved, a standby device and a faulty device are directly connected through a cable, the standby device supplies power to a switching circuit and a memory of the faulty device, and the standby device can directly and quickly back up configuration information of the faulty device, thereby implementing fast fault recovery. The device information backup method provided in the embodiment of the present invention is simple and efficient, and its reliability and security are high.

Figure 12:
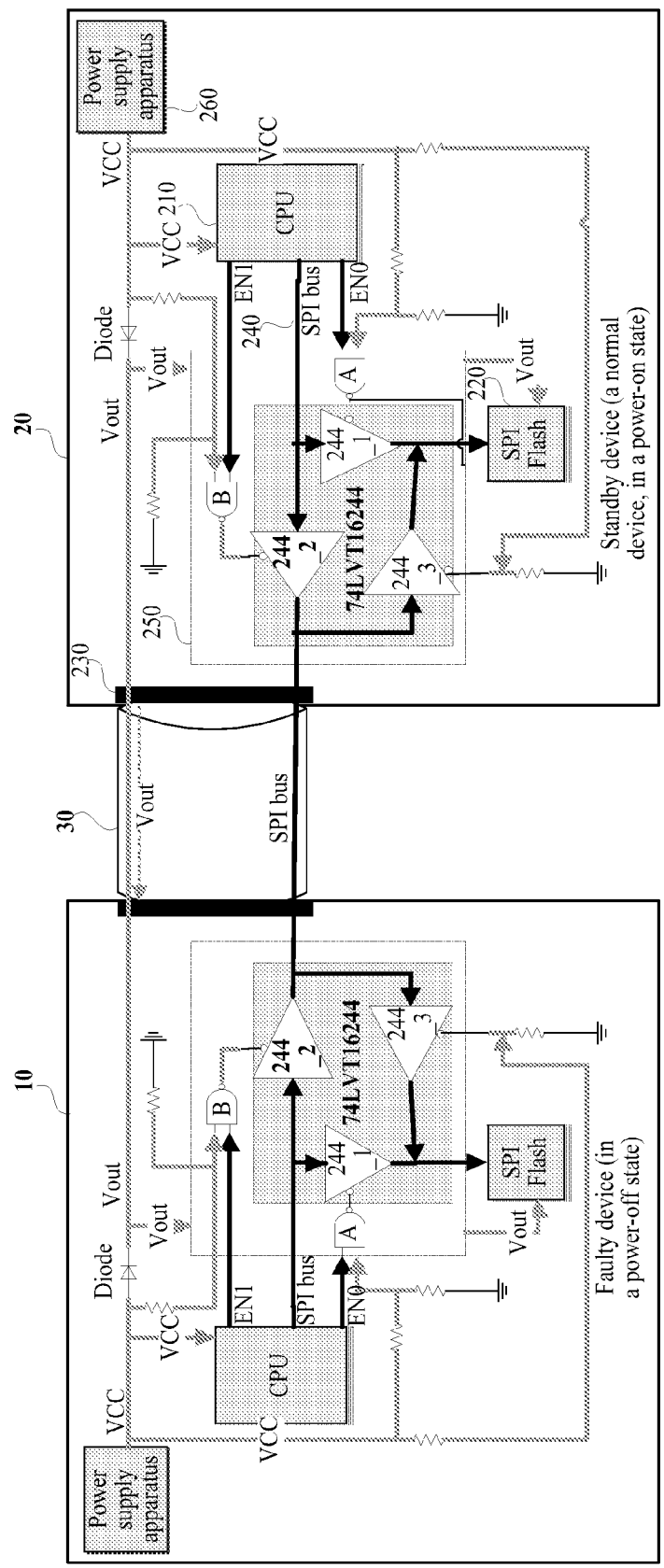
FIG. 12 is a schematic structural diagram of hardware connections of a standby device 20 using an SPI bus according to an embodiment of the present invention.
Figure 13:
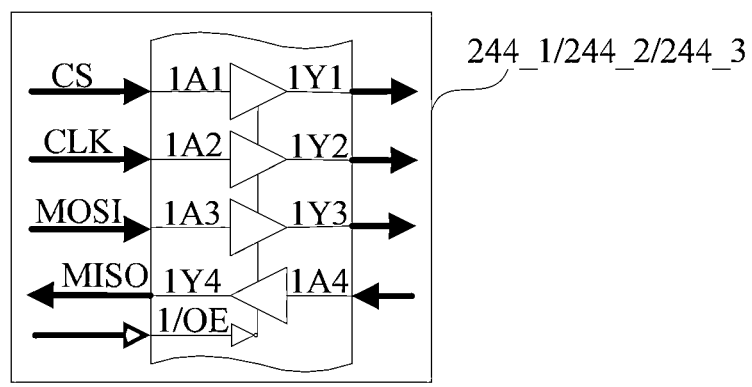
FIG. 13 is a schematic diagram of specific signal connections of an SPI bus switch according to an embodiment of the present invention.

Refer to FIG. 12, which is a schematic diagram of a hardware structure of a standby device 20 using an SPI bus according to an embodiment of the present invention, where a processor is a CPU 210, a memory is a flash memory Flash 220 using an SPI bus interface, a backup port 230 may be a serial port, and a bus is an SPI bus 240. In the embodiment of the present invention, a switching circuit 250 is composed of a 16-channel tri-state output bus driver 74LVT16244 and two NAND gates A and B in a dashed box in FIG. 12. It should be noted that the 74LVT16244 includes four sets of drivers, only three sets, 244_1, 244_2, and 244_3, need to be used in the embodiment of the present invention, and each set is an SPI bus switch. Refer to FIG. 13, which is a schematic diagram of specific signal connections of an SPI bus switch according to an embodiment of the present invention. As shown in FIG. 12, a faulty device 10 and a standby device 20 have a same hardware connection structure and are connected through a cable 30.

In this embodiment, the faulty device 10 is in a power-off state, and therefore its CPU does not work, its Vcc has no power, which is indicated by a logic 0, and output of the NAND gates A and B is "1", and therefore 244_1 and 244_2 are switched off, 244_3 is switched on, and the Flash is connected to the standby device 20 through 244_3. The standby device 20 is in a power-on state, the CPU is powered by a power supply Vcc and works normally, and the switching circuit 250 and the Flash 220 are powered by a Vout that is output to the cable 30. The Vcc is powered on, which is indicated by a logic 1, 244_3 is switched off, and switching on/off of 244_1 and 244_2 is controlled by control signals EN0 and EN1 output by the CPU. When EN0=1 and EN1=0, 244_1 is switched on, 244_2 is switched off, and the CPU can read and write the local memory Flash 220. When EN0=0 and EN1=1, 244_1 is switched off, 244_2 is switched on, and the CPU can access, through 244_2, the backup port 230, the cable 30, a backup port of the faulty device 10, and 244_3 of the faulty device 10, the Flash of the faulty device 10, read configuration information of the faulty device 10, and write the configuration information into the local memory Flash 220 to complete configuration information backup.

According to the technical solution provided in this embodiment, no intermediate medium, such as a computer or a pluggable storage medium, needs to be involved, a standby device and a faulty device are directly connected through a cable, and a processor of the standby device is connected to its own memory or a memory of the faulty device by controlling a switching circuit so as to ensure that configuration information of the faulty device is correctly backed up to its own memory, thereby implementing fast fault recovery. The device information backup method provided in the embodiment of the present invention is simple and efficient, and its reliability and security are high.

The foregoing descriptions are merely exemplary embodiments of the present invention, but are not intended to limit the present invention. Any variation or replacement made by persons skilled in the art without departing from the technical scopes of the present invention shall fall within the protection scope of the present invention.

What is claimed is:

1. A second device, comprising a second processor, a second memory, a second backup port, a second power supply apparatus, a second switching circuit, a second diode and a second bus, wherein: the second processor, the second memory, and the second backup port are connected to the second bus and communicate through the second bus, the second switching circuit is located on the second bus and between the second processor and the second memory;

the second device is directly connected to a first device through a cable, wherein the first device comprises a first processor, a first memory, a first backup port, a first switching circuit, a first diode and a first bus; the first processor, the first memory, and the first backup port are connected to the first bus and communicate through the first bus; the first switching circuit is located on the first bus and between the first processor and the first memory; wherein the first bus and the second bus are of a same type;

the second power supply apparatus is configured to supply power to the second processor, the second memory and the second switching circuit, and to the first switching circuit and the first memory through the cable when the second device is in a power-on state and the first device is in a power-off state, wherein the power through the cable and supplied by the second power supply apparatus is separated by the first diode from being supplied to the first processor;

the second diode is configured to ensure other power which is through the cable and supplied by the first power supply apparatus being supplied only to the second memory and the second switching circuit when the second power supply apparatus is stopped; and the second processor is configured to read, directly from the first memory through the second bus, the second backup port, the cable, the first backup port and the first bus, information to be backed up and write into the second memory the information to be backed up, wherein the cable connects the second backup port and the first backup port of the first device.

2. The second device according to claim 1, wherein the second bus is a shared bus;

the second memory keeps being connected to the second backup port; and the second switching circuit is configured to connect the second processor to or disconnect the second processor from the second memory and the second backup port according to a control signal.

3. The second device according to claim 2, wherein the second processor comprises a buffer, and the buffer is configured to save, after the second processor acquires the information to be backed up and before the information is written into the second memory, the information to be backed up.

4. The second device according to claim 1, wherein the second bus is a point-to-point bus; and the second switching circuit is configured to connect any two of the second processor, the second memory, and the second backup port according to a control signal.

5. The second device according to claim 4, wherein:

the second processor is configured to output a first control signal to the second switching circuit, so that the second switching circuit connects the second processor and the second backup port, and read, directly from the first memory of the first device through the second backup port, the cable, and the first backup port of the first device, the information to be backed up; and then output a second control signal to the second switching circuit, so that the second switching circuit connects the second processor and the second memory, and write into the second memory the information to be backed up.

6. The second device according to claim 5, wherein the second processor comprises a buffer, and the buffer is configured to save, after the second processor acquires the information to be backed up and before the information is written into the second memory, the information to be backed up.

7. A device information backup method for information backup between a first device and a second device, wherein the second device is directly connected to the first device through a cable, the second device comprises a second processor, a second memory, a second backup port, a second switching circuit, a second diode and a second bus; the second processor, the second memory, and the second backup port are connected to the second bus and communicate through the second bus; the second switching circuit is located on the second bus and between the second processor and the second memory; the first device comprises a first processor, a first memory, a first backup port, a first switching circuit, a first diode and a first bus, wherein the first processor, the first memory, and the first backup port are connected to the first bus and communicate through the first bus; and the first switching circuit is located on the first bus and between the first processor and the first memory; the cable connects the second backup port and the first backup port; and the method comprising:

supplying, by the second power supply apparatus, power to the second processor, the second memory and the second switching circuit, and to the first switching circuit and the first memory through the cable when the second device is in a power-on state and the first device is in a power-off state, wherein the power through the cable and supplied by the second power supply apparatus is separated by the first diode from being supplied to the first processor, the first processor and the first memory are in a disconnected state;

reading, by the second processor, directly from the first memory through the second bus, the second backup port, the cable, the first backup port and the first bus, information to be backed up; wherein the first bus and the second bus are of a same type; and writing, by the second processor, the information to be backed up into the second memory.

8. The method according to claim 7, wherein and the second bus is a point-to-point bus;

wherein before reading directly from the first memory the information to be backed up, the method further comprises: outputting, by the second processor, a first control signal to the second switching circuit, and connecting, by the second switching circuit, the second processor and the second backup port according to the first control signal, wherein the first backup port of the first device and the first memory of the first device are in a connected state; and wherein after reading, directly from the first memory the information to be backed up and before writing the information to be backed up, the method further comprises: outputting, by the second processor, a second control signal to the second switching circuit, and connecting, by the second switching circuit, the second processor and the second memory according to the second control signal.

9. A device information backup system, comprising a first device, a second device and a cable, wherein the first device is directly connected to the second device through the cable;

the first device comprises a first processor, a first memory, a first backup port, a first power supply apparatus, a first switching circuit, a first diode and a first bus; the first processor, the first memory, and the first backup port are connected to the first bus and communicate through the first bus; and the first switching circuit is located on the first bus and between the first processor and the first memory;

the second device comprises a second processor, a second memory, a second backup port, a second power supply apparatus, a second switching circuit, a second diode and a second bus; the second processor, the second memory, and the second backup port are connected to the second bus and communicate through the second bus, the cable connects the second backup port and the first backup port; and the second switching circuit is located on the second bus and between the second processor and the second memory;

when the first device is in the power-on state and the second device is in the power-off state, the first power supply apparatus is configured to supply first power to the first processor, the first memory and the first switching circuit, and to the second switching circuit and the second memory through the cable, wherein the first power through the cable and supplied by the second power supply apparatus is separated by the second diode from being supplied to the second processor; and the first processor is configured to read, directly from the second memory through the first bus, the first backup port, the cable, the second backup port and the second bus, first information to be backed up and write into the first memory the first information to be backed up;

when the second device is in a power-on state and the first device is in a power-off state, the second power supply apparatus is configured to supply second power to the second processor, the second memory and the second switching circuit, and to the first switching circuit and the first memory through the cable, wherein the second power through the cable and supplied by the second power supply apparatus is separated by the first diode from being supplied to the first processor; the second processor is configured to read, directly from the first memory through the second bus, the second backup port, the cable, the first backup port and the first bus, second information to be backed up and write into the second memory the second information to be backed up;

wherein the cable connects the second backup port and the first backup port of the first device, the first bus and the second bus are of a same type.

10. The system according to claim 9, wherein the second bus is a shared bus, and the second memory keeps being connected to the second backup port;

the second switching circuit is configured to connect the second processor to or disconnect the second processor from the second memory and the second backup port according to a control signal.

11. The system according to claim 9, wherein the second bus is a point-to-point bus;

the second switching circuit is configured to connect any two of the second processor, the second memory, and the second backup port according to a control signal;

the second processor is configured to output a first control signal to the second switching circuit, so that the second switching circuit connects the second processor and the second backup port, and read, directly from the first memory through the second bus, the second backup port, the cable, the first backup port and the first bus, the second information to be backed up; and then output a second control signal to the second switching circuit, so that the second switching circuit connects the second processor and the second memory, and write into the second memory the second information to be backed up.

* * * * *